United States Patent
Yamazaki

(10) Patent No.: US 9,485,766 B2
(45) Date of Patent: Nov. 1, 2016

(54) MOBILE COMMUNICATION SYSTEM, MOBILE COMMUNICATION METHOD, AND RADIO BASE STATION

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/381,344

(22) PCT Filed: Feb. 27, 2013

(86) PCT No.: PCT/JP2013/055204
§ 371 (c)(1),
(2) Date: Aug. 27, 2014

(87) PCT Pub. No.: WO2013/129506
PCT Pub. Date: Sep. 6, 2013

(65) Prior Publication Data
US 2015/0029974 A1    Jan. 29, 2015

Related U.S. Application Data

(60) Provisional application No. 61/604,733, filed on Feb. 29, 2012.

(51) Int. Cl.
*H04W 4/00* (2009.01)
*H04W 72/04* (2009.01)
*H04L 5/00* (2006.01)

(52) U.S. Cl.
CPC .......... *H04W 72/044* (2013.01); *H04L 5/0037* (2013.01); *H04L 5/0053* (2013.01); *H04W 72/04* (2013.01); *H04W 72/042* (2013.01)

(58) Field of Classification Search
None
See application file for complete search history.

(56) References Cited

U.S. PATENT DOCUMENTS

| 8,311,550 B2 | 11/2012 | Miki et al. |
| 8,374,162 B2 | 2/2013 | Higuchi et al. |
| 8,705,461 B2 | 4/2014 | Bala et al. |
| 2007/0211657 A1 | 9/2007 | McBeath et al. |
| 2008/0123593 A1 | 5/2008 | Fujita et al. |

(Continued)

FOREIGN PATENT DOCUMENTS

| EP | 1903705 A1 | 3/2008 |
| EP | 1962458 A1 | 8/2008 |

(Continued)

OTHER PUBLICATIONS

Communication pursuant to Rule 164(1) EPC issued by the European Patent Office on Jun. 18, 2015, which corresponds to European Patent Application No. 13755662.7-1857 and is related to U.S. Appl. No. 14/381,344.

(Continued)

*Primary Examiner* — Edan Orgad
*Assistant Examiner* — Rebecca Song
(74) *Attorney, Agent, or Firm* — Studebaker & Brackett PC

(57) ABSTRACT

The mobile communication system is a system in which one resource block is configured by a plurality of resource elements. The mobile communication system comprises an assignment unit that divides the one resource block, and assigns the divided resource blocks to a plurality of radio terminals. A division pattern of the one resource block is decided beforehand.

10 Claims, 9 Drawing Sheets

(56) References Cited

U.S. PATENT DOCUMENTS

| | | | |
|---|---|---|---|
| 2009/0129362 A1 | 5/2009 | Higuchi et al. | |
| 2010/0184447 A1* | 7/2010 | Miki | H04L 5/0007 455/450 |
| 2010/0227569 A1 | 9/2010 | Bala et al. | |
| 2010/0309873 A1* | 12/2010 | Nishio | H04B 7/12 370/329 |
| 2010/0331030 A1* | 12/2010 | Nory | H04L 5/0053 455/509 |
| 2011/0300890 A1* | 12/2011 | Hoshino | H04L 5/0051 455/509 |
| 2014/0355493 A1* | 12/2014 | Niu | H04L 12/189 370/280 |

FOREIGN PATENT DOCUMENTS

| | | |
|---|---|---|
| EP | 1978663 A1 | 10/2008 |
| EP | 2056502 A1 | 5/2009 |
| JP | 2007-288754 A | 11/2007 |
| WO | 98/10534 A1 | 3/1998 |
| WO | 2008/156062 A1 | 12/2008 |
| WO | 2010/048178 A1 | 4/2010 |

OTHER PUBLICATIONS

International Search Report; PCT/JP2013/055204; May 14, 2013.
NTT DoCoMo et al.; "Distributed FDMA Transmission for Shared Data Channel in E-UTRA Downlink"; 3GPP TSG RAN WG1 Meeting #45 R1-061182; Shanghai, China May 8, 2006.
3GPP TS 36.211 V10.4.0 (Dec. 2011); 3rd Generation Partnership Project; Technical Specification Group Radio Access Network; Evolved Universal Terrestrial Radio Access (E-UTRA) Physical Channels and Modulation (Release 10).
The extended European search report issued by the European Patent Office on Jul. 18, 2016, which corresponds to European Patent Application No. 16166905.6-1857 and is related to U.S. Appl. No. 14/381,344.

* cited by examiner

THE NUMBER OF ASSIGNED RBS

MOBILE COMMUNICATION SYSTEM, MOBILE COMMUNICATION METHOD, AND RADIO BASE STATION

TECHNICAL FIELD

The present invention relates to a mobile communication system in which one resource block is configured by a plurality of resource elements, a mobile communication method used in the mobile communication system, and a radio base station.

BACKGROUND ART

In the recent years, a next-generation communication system called LTE (Long Term Evolution) has become known. In LTE, a radio resource can be assigned to each one resource block. Furthermore, on a frequency axis and a time axis, it is possible to divide and assign a radio resource to a plurality of users. It should be noted that one resource block is configured by a plurality of resource elements.

PRIOR ART DOCUMENT

Non-Patent Document

[Non-patent Document 1] 3GPP TS36.211 V10.4.0 (2011-12)

SUMMARY OF THE INVENTION

In techniques, such as MTC (Machine Type Communication), connection confirmation (Keep Alive), and VoIP, a small amount of data is expected to be transmitted and received between a large number of radio terminals and radio base stations.

In such a case, if the minimum unit of radio resources to be assigned is one resource block, then it is probable that the radio resources will be in short supply.

A mobile communication system according to first aspect is a system in which one resource block is configured by a plurality of resource elements. The mobile communication system comprises an assignment unit that divides the one resource block, and assigns the divided resource blocks to a plurality of radio terminals. A division pattern of the one resource block is decided beforehand.

In the first aspect, one resource block is configured by a plurality of subcarriers. The assignment unit divides the one resource block on a frequency axis, and assigns the divided resource blocks to a plurality of radio terminals.

In the first aspect, the subcarriers configuring the divided resource blocks are in continuation on the frequency axis.

In the first aspect, a radio resource is configured by a plurality of resource blocks. The one resource block whose division is allowed is a part of a plurality of resource blocks.

In the first aspect, the one resource block is configured by a plurality of symbols. The assignment unit divides the one resource block on a time axis, and assigns the divided resource blocks to a plurality of radio terminals.

In the first aspect, the assignment unit divides the one resource block on a frequency axis and a time axis, and assigns the divided resource blocks to a plurality of radio terminals.

A mobile communication system according to second aspect is a system in which one resource block is configured by a plurality of resource elements. The one resource block is divided, and the divided resource blocks are assigned to a plurality of radio terminals. The mobile communication system comprises a notification unit that notifies downlink scheduling control information to the plurality of radio terminals. The downlink scheduling control information includes at least a resource block that starts the division of the one resource block, and a division pattern of the one resource block.

In the second aspect, the one resource block is configured by a plurality of subcarriers. The assignment unit divides the one resource block, the divided resource blocks are assigned to a plurality of radio terminals.

In the second aspect, the downlink scheduling control information is identified by a temporary identifier used exclusively in the division of the one resource block.

In the second aspect, the mobile communication system comprises a determination unit that determines whether or not the one resource block is to be divided. The notification unit notifies the downlink scheduling control information when it is determined that the one resource block is to be divided.

In the second aspect, the one resource block is configured by a plurality of subcarriers. The one resource block is divided on a frequency axis, and the divided resource blocks are assigned to a plurality of radio terminals.

In the second aspect, the one resource block is divided on a frequency axis and a time axis, and the divided resource blocks are assigned to a plurality of radio terminals.

A mobile communication method according to third aspect is a method used in a mobile communication system in which one resource block is configured by a plurality of resource elements. The mobile communication method comprised a step A of dividing the one resource block, and assigning the divided resource blocks to a plurality of radio terminals. A division pattern of the one resource block is decided beforehand.

A mobile communication method according to forth aspect is a method used in a mobile communication system in which one resource block is configured by a plurality of resource elements. The one resource block is divided, and the divided resource blocks are assigned to a plurality of radio terminals. The mobile communication method comprises a step A of notifying downlink scheduling control information to the plurality of radio terminals. The downlink scheduling control information includes at least a resource block that starts the division of the one resource block, and a division pattern of the one resource block.

A radio base station according to fifth aspect is used in a mobile communication system in which one resource block is configured by a plurality of resource elements. The radio base station comprises an assignment unit that divides the one resource block, and assigns the divided resource blocks to a plurality of radio terminals. A division pattern of the one resource block is decided beforehand.

A radio base station according to sixth aspect is used in a mobile communication system in which one resource block is configured by a plurality of resource elements. The one resource block is divided, and the divided resource blocks are assigned to a plurality of radio terminals. The radio base station comprises a notification unit that notifies downlink scheduling control information to the plurality of radio terminals. The downlink scheduling control information includes at least a resource block that starts the division of the one resource block, and a division pattern of the one resource block.

MODES FOR CARRYING OUT THE INVENTION

Figure 1:
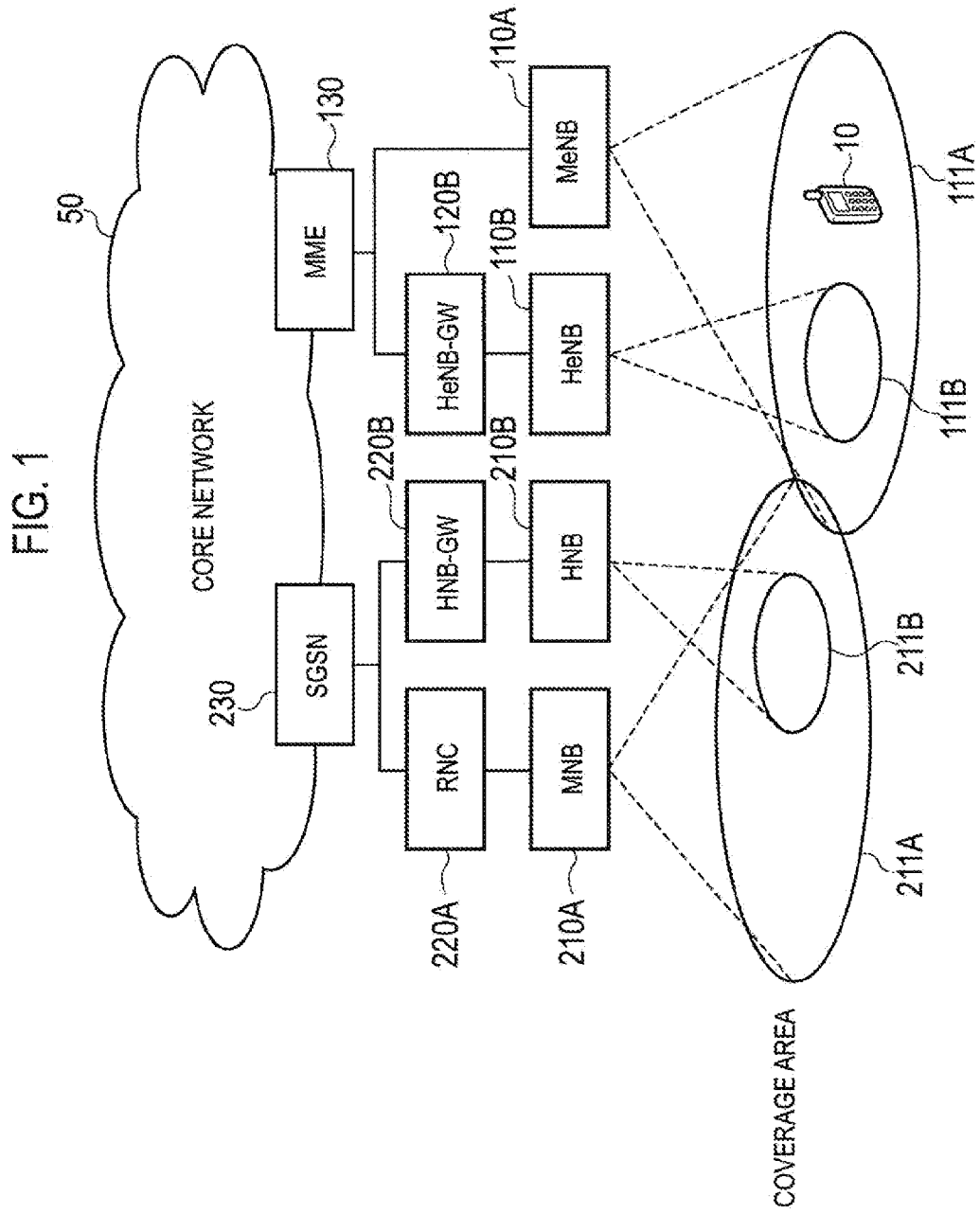
FIG. 1 is a diagram illustrating a mobile communication system 100 according to a first embodiment.

Hereinafter, a mobile communication system according to an embodiment of the present invention will be described with reference to the accompanying drawings. Note that in the descriptions of the drawing below, identical or similar symbols are assigned to identical or similar portions.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

Overview of Embodiments

Firstly, the mobile communication system according to the embodiment is a system in which one resource block is configured by a plurality of resource elements. The mobile communication system comprises an assignment unit that divides the one resource block and assigns the divided resource blocks to a plurality of radio terminals. A division pattern of the one resource block is decided beforehand.

In the embodiment, an assignment unit divides one resource block, and assigns the divided resource blocks to a plurality of radio terminals. As a result, when it is necessary to communicate a small amount of data with a large number of radio terminals, the shortage of radio resources can be prevented as compared to the case where the minimum unit of radio resources to be assigned is one resource block.

The upper limit of the number of divided resource blocks continuing on a frequency axis may be decided beforehand. In downlink communication, rather than deciding beforehand the upper limit of the number of divided resource blocks continuing on the frequency axis, the upper limit of the number of divided resource blocks assigned in a predetermined frequency range on the frequency axis may be decided beforehand. In such a case, consideration must be given to the fact that the technique of dividing one resource block is particularly suitable for transmitting and receiving small amounts of data.

Furthermore, consideration must also be given to the fact that when the upper limit of the number of divided resource blocks continuing on the frequency axis is decided beforehand, the division pattern of one resource block is decided beforehand, and therefore, the amount of data of downlink scheduling control information (DCI; Downlink Control Information) used for notifying the division and assignment of one resource block to the radio terminal is reduced.

Secondly, the mobile communication system according to the embodiment is a system in which one resource block is configured by a plurality of resource elements. The one resource block is divided and the divided resource blocks are assigned to a plurality of radio terminals. The mobile communication system is provided with a notification unit that notifies the downlink scheduling control information to the plurality of radio terminals. The downlink scheduling control information includes at least a resource block that starts the division of the one resource block, and the division pattern of the one resource block.

In the embodiment, the notification unit notifies the downlink scheduling control information (DCI; Downlink Control Information) including at least a resource block that starts the division of the one resource block, and the division pattern of the one resource block, to a plurality of radio terminals. As a result, even when one resource block is divided, each radio terminal can appropriately receive the signal transmitted using the divided resources.

Furthermore, one resource block is divided and the divided resource blocks are assigned to a plurality of radio terminals. As a result, when it is necessary to communicate a small amount of data with a large number of radio terminals, the shortage of radio resources can be prevented as compared to the case where the minimum unit of radio resources to be assigned is one resource block.

First Embodiment

Mobile Communication System

Hereinafter, a mobile communication system according to a first embodiment will be described. FIG. 1 is a diagram illustrating a mobile communication system 100 according to the first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system, for example, is a communication system corresponding to LTE (Long Term Evolution). The first communication system, for example, includes a base station 110A (hereinafter, referred to as MeNB 110A), a home base station 110B (hereinafter, referred to as HeNB 110B), a home base station gateway 120B (hereinafter, referred to as HeNB-GW 120B), and MME 130.

In addition, a radio access network (E-UTRAN; Evolved Universal Terrestrial Radio Access Network) corresponding to the first communication system is configured by the MeNB 110A, the HeNB 110B, and the HeNB-GW 120B.

The second communication system, for example, is a communication system corresponding to UMTS (Universal Mobile Telecommunication System). The second communication system, includes a base station 210A (hereinafter, referred to as MNB 210A), a home base station 210B (hereinafter, referred to as HNB 210B), RNC 220A, a home base station gateway 220B (hereinafter, referred to as HNB-GW 220B), and SGSN 230.

In addition, a radio access network (UTRAN; Universal Terrestrial Radio Access Network) corresponding to the second communication system is configured by the MNB 210A, the HNB 210B, the RNC 220A, and the HNB-GW 220B.

The UE 10 is a device (User Equipment) configured to communicate with the second communication system or the first communication system. For example, the UE 10 has a function of performing radio communication with the MeNB 110A and the HeNB 110B. Alternatively, the UE 10 has a function of performing radio communication with the MNB 210A and the HNB 210B.

The MeNB 110A, which manages a general cell 111A, is a device (evolved NodeB) configured to perform radio communication with the UE 10 being present in the general cell 111A.

The HeNB 110B, which manages a specific cell 111B, is a device (Home evolved NodeB) configured to perform radio communication with the UE 10 being present in the specific cell 111B.

The HeNB-GW 120B, which is connected to the HeNB 110B, is a device (Home evolved NodeB Gateway) configured to manage the HeNB 110B.

The MME 130, which is connected to the MeNB 110A, is a device (Mobility Management Entity) configured to manage the mobility of the UE 10 having set up of a radio connection with the MeNB 110A. Furthermore, the MME 130, which is connected to the HeNB 110B via the HeNB-GW 120B, is a device configured to manage the mobility of the UE 10 having set up of a radio connection with the HeNB 110B.

The MNB 210A, which manages a general cell 211A, is a device (NodeB) configured to perform radio communication with the UE 10 being present in the general cell 211A.

The HNB 210B, which manages a specific cell 211B, is a device (Home NodeB) configured to perform radio communication with the UE 10 being present in the specific cell 211B.

The RNC 220A, which is connected to the MNB 210A, is a device (Radio Network Controller) configured to set up a radio connection (RRC connection) with the UE 10 being present in the general cell 211A.

The HNB-GW 220B, which is connected to the HNB 210B, is a device (Home NodeB Gateway) configured to set up a radio connection (RRC Connection) with the UE 10 being present in the specific cell 211B.

The SGSN 230 is a device (Serving GPRS Support Node) configured to perform packet switching in a packet switching domain. The SGSN 230 is provided in the core network 50. Although not illustrated in FIG. 1, a device (MSC; Mobile Switching Center) configured to perform circuit switching in a circuit switching domain may be provided in the core network 50.

In addition, it is noted that the general cell and the specific cell are understood as a function of performing radio communication with the UE 10. However, the general cell and the specific cell are also used as a term indicating a coverage area of a cell. Furthermore, cells such as general cells and specific cells are identified by frequencies, spreading codes, time slots and the like used in the cells.

Here, a coverage area of the general cell is wider than a coverage area of the specific cell. The general cell, for example, is a macro cell provided by a communication provider. The specific cell, for example, is a femto cell or a home cell provided by the third party other than the communication provider. The specific cell may be a CSG (Closed Subscriber Group) cell or a pico cell provided by the communication provider.

Hereinafter, the first communication system will be mainly described. The following description may also be applied to the second communication system.

Here, in the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, an uplink channel includes an uplink control channel (PUCCH; Physical Uplink Control Channel), an uplink shared channel (PUSCH; Physical Uplink Shared Channel), and the like. Furthermore, a downlink channel includes a downlink control channel (PDCCH; Physical Downlink Control Channel), a downlink shared channel (PDSCH; Physical Downlink Shared Channel), and the like.

The uplink control channel is a channel used to transfer a control signal. The control signal, for example, includes CQI (Channel Quality Indicator), PMI (Precoding Matrix Indicator), RI (Rank Indicator), SR (Scheduling Request), and ACK/NACK.

The CQI is a signal for notifying a recommended modulation method and an encoding rate to be used in downlink transmission. The PMI is a signal indicating a precoder matrix which is preferably used in downlink transmission. The RI is a signal indicating the number of layers (the number of streams) to be used in downlink transmission. The SR is a signal for requesting the assignment of an uplink radio resource (a resource block which will be described later). The ACK/NACK is a signal indicating whether a signal transmitted via the downlink channel (for example, the PDSCH) has been successfully received.

The uplink shared channel is a channel used to transfer a control signal (including the above-mentioned control signal) and/or a data signal. For example, the uplink radio resource may be assigned only to the data signal, or assigned such that the data signal and the control signal are multiplexed.

The downlink control channel is a channel used to transfer downlink scheduling control information (DCI; Downlink Control Information). The downlink scheduling control information, for example, includes Uplink SI (Scheduling Information), Downlink SI (Scheduling Information), and a TPC bit.

The Uplink SI is a signal indicating the assignment of the uplink radio resource. The Downlink SI is a signal indicating the assignment of a downlink radio resource. The TPC bit is a signal for instructing increase or decrease in the power of a signal transmitted via the uplink channel.

The downlink shared channel is a channel used to transfer a control signal and/or a data signal. For example, the downlink radio resource may be assigned only to the data signal, or assigned such that the data signal and the control signal are multiplexed.

In addition, a control signal transmitted via the downlink shared channel includes TA (Timing Advance). The TA is transmission timing correction information between the UE 10 and the MeNB 110A, and is measured by the MeNB 110A on the basis of an uplink signal transmitted from the UE 10.

Furthermore, a control signal transmitted via a channel, other than the downlink control channel (the PDCCH) and the downlink shared channel (the PDSCH), includes ACK/

NACK. The ACK/NACK is a signal indicating whether a signal transmitted via the uplink channel (for example, the PUSCH) has been successfully received.

The general cell and the specific cell broadcast broadcast information via a broadcast channel (BCCH; Broadcast Control Channel). The broadcast information, for example, is information such as MIB (Master Information Block) or SIB (System Information Block).

(Radio Frame)

Figure 2:
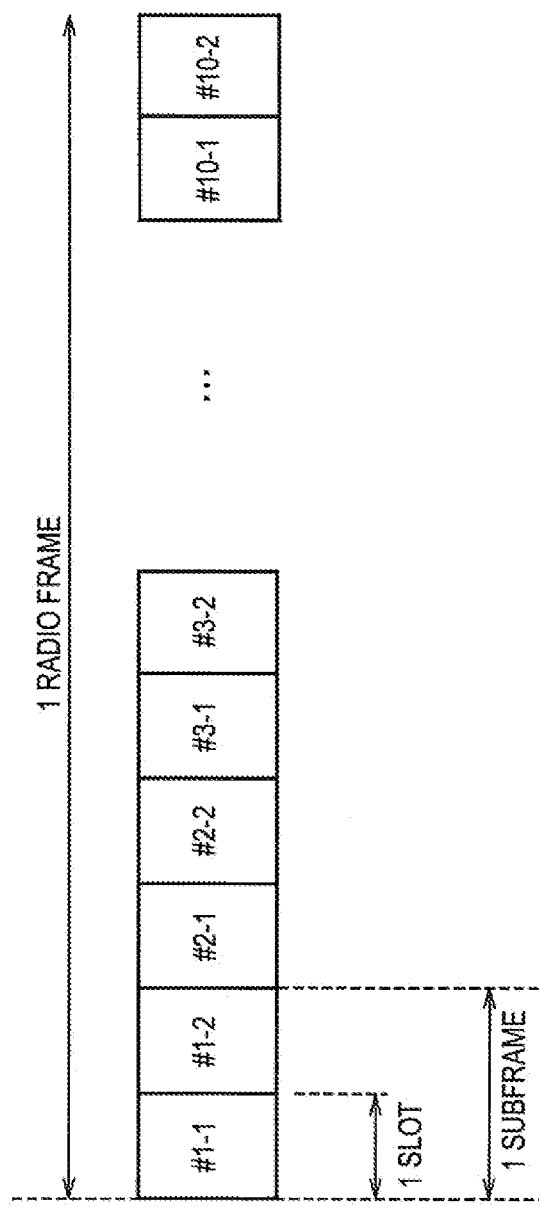
FIG. 2 is a diagram illustrating a radio frame according to the first embodiment.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in the downward direction. In the same manner, one slot is configured by a plurality of SC-FDMA symbols (for example, six SC-FDMA symbols or seven SC-FDMA symbols) in the upward direction.

(Radio Resource)

Figure 3:
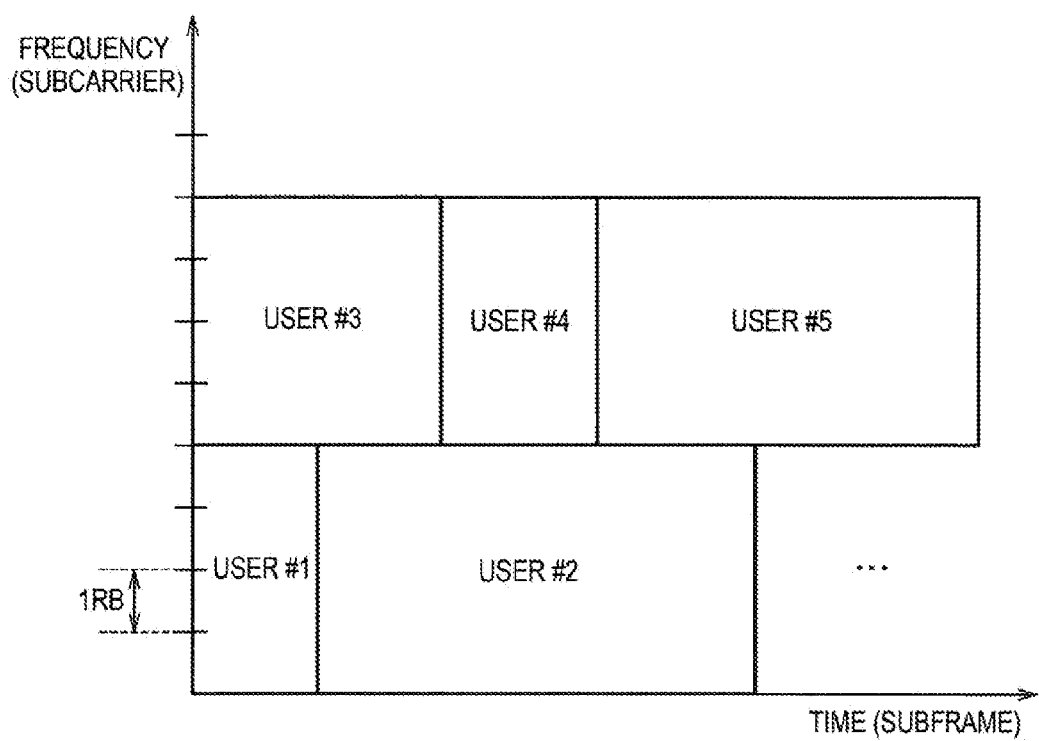
FIG. 3 is a diagram illustrating a radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each one resource block. Furthermore, on the frequency axis and the time axis, it is possible to divide the radio resources to assign the same to a plurality of users (for example, user #1 to user #5).

Furthermore, the radio resource is assigned by the MeNB 110A. The MeNB 110A assigns the radio resources to each UE 10 on the basis of the CQI, the PMI, the RI and the like.

(Application Scene)

Figure 4:
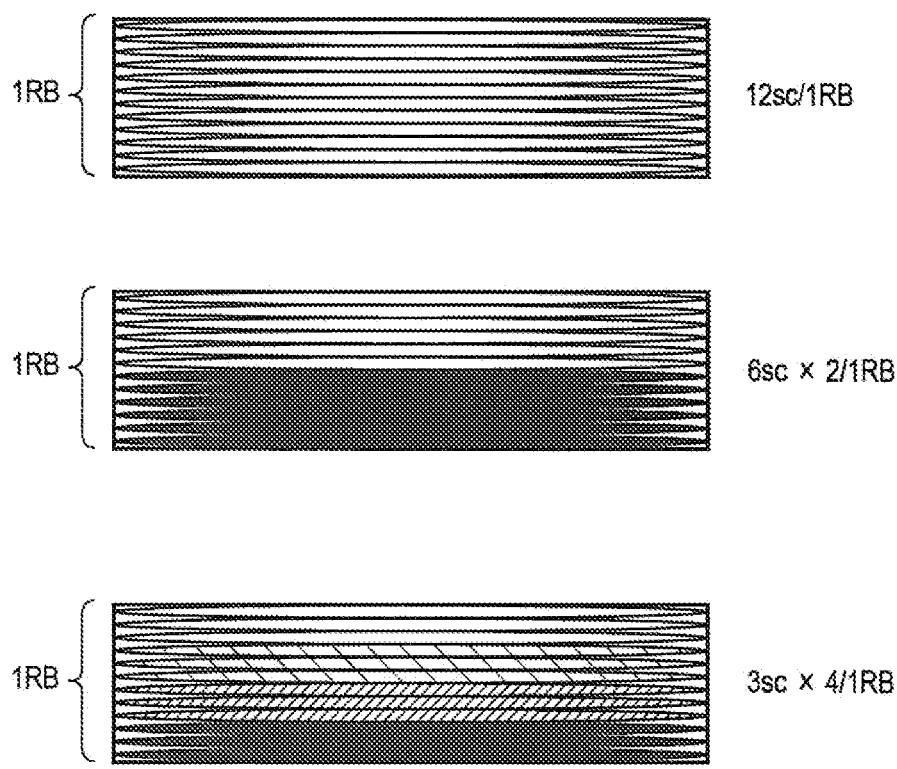
FIG. 4 is a diagram illustrating a case where the first embodiment is applied.

Hereinafter, a scene where the first embodiment is applied will be described. FIG. 4 is a diagram for explaining a scene where the first embodiment is applied.

As described above, in the first communication system, as a principle, radio resources can be assigned to each one resource block. In contrast, in the first embodiment, one resource block is divided on the frequency axis, and the assignment of the divided resource blocks (the divided resource block) is allowed.

Specifically, as illustrated in FIG. 4, for example, a pattern in which one resource block is not divided (the number of subcarriers configuring one divided resource block is 12 sc's, for example), a pattern in which one resource block is divided into two (the number of subcarriers configuring one divided resource block is 6 sc's, for example), and a pattern in which one resource block is divided into four (the number of subcarriers configuring one divided resource block is 3 sc's, for example) are allowed.

The division of one resource block is preferably applicable in cases where a small amount of data is communicated with a large number of UEs 10. Therefore, it is preferable to decide beforehand the upper limit of the number of divided resource blocks continuing on the frequency axis.

The division pattern of one resource block is decided beforehand. In the example illustrated in FIG. 4, in order to identify the divided resource blocks, each UE 10 may identify which of the seven divided resource blocks is assigned to the local terminal. That is, in the example illustrated in FIG. 4, there are seven types of division patterns of one resource block.

The subcarriers configuring the divided resource block are preferably continuous on the frequency axis. However, if a frequency hopping pattern is decided beforehand, the subcarriers configuring the divided resource block need not necessarily be continuous on the frequency axis.

Figure 5:
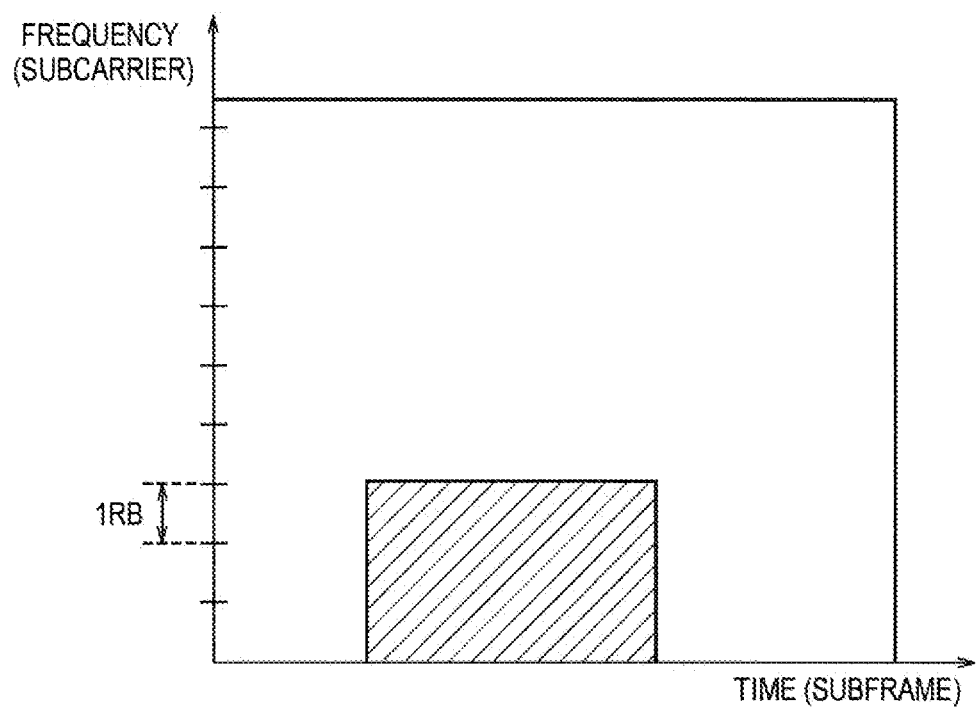
FIG. 5 is a diagram illustrating a case where the first embodiment is applied.

As described above, a radio resource is configured by a plurality of resource blocks. As illustrated in FIG. 5, the one resource block whose division is allowed is preferably a part of a plurality of resource blocks (an entire radio resource).

In this way, in order to realize the division of one resource block, the radio base station (MeNB 110A or HeNB 110B) transmits the downlink scheduling control information (DCI) to the UE 10 in a newly defined format.

Specifically, in the newly defined format, the downlink scheduling control information (hereinafter, dedicated DCI) includes at least a resource block that starts the division of one resource block (hereinafter, the starting RB), and the division pattern of one resource block (hereinafter, the division pattern). In addition to the starting RB and the division pattern, the dedicated DCI may include the number of divided resource blocks continuing on the time axis (hereinafter, the number of assigned RBs).

In the first embodiment, the division of one resource block may be applicable to a downlink shared channel (PDSCH), or may be applicable to an uplink shared channel (PUSCH; Physical Uplink Shared Channel).

For example, if the UE 10 is operating at 10 MHz, the UE 10 can identify 50 resource blocks in one radio frame. In such a case, the starting RB can be realized in six bits. Furthermore, in the case illustrated in FIG. 4, because there are seven types of division patterns, the division patterns can be realized in three bits.

Figure 6:
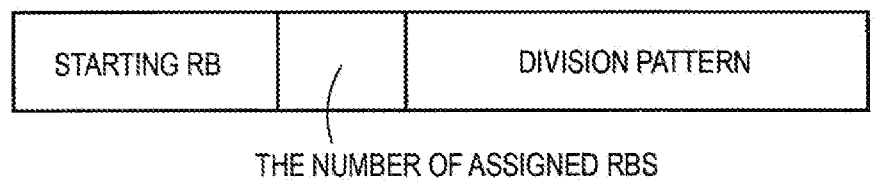
FIG. 6 is a diagram illustrating an example of a format of a dedicated DCI according to the first embodiment.

In a downlink shared channel, a plurality of resource blocks can be assigned to the UE 10 on the frequency axis. In view of a case in which the division of one resource block is applicable to the communication of a small amount of data, if the upper limit of the number of assigned RBs is restricted to "4", the number of assigned RBs can be realized in two bits. That is, as illustrated in FIG. 6, the dedicated DCI applicable to a downlink shared channel includes a starting RB (for example, six bits), the number of assigned RBs (for example, two bits), and a division pattern (for example, three bits).

Figure 7:
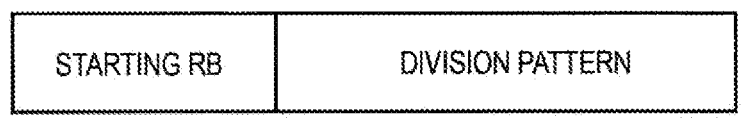
FIG. 7 is a diagram illustrating an example of a format of a dedicated DCI according to the first embodiment.

On the other hand, in an uplink shared channel, only one resource block can be assigned to the UE 10 on the time axis. Therefore, the number of assigned RBs is not required. That is, as illustrated in FIG. 7, the dedicated DCI applicable to an uplink shared channel includes a starting RB (for example, six bits) and a division pattern (for example, three bits).

The dedicated DCI is preferably identified by a temporary identifier (hereinafter, a dedicated RNTI) used exclusively in the division of one resource block, so as to differentiate from an existing DCI.

(Radio Base Station)

Figure 8:
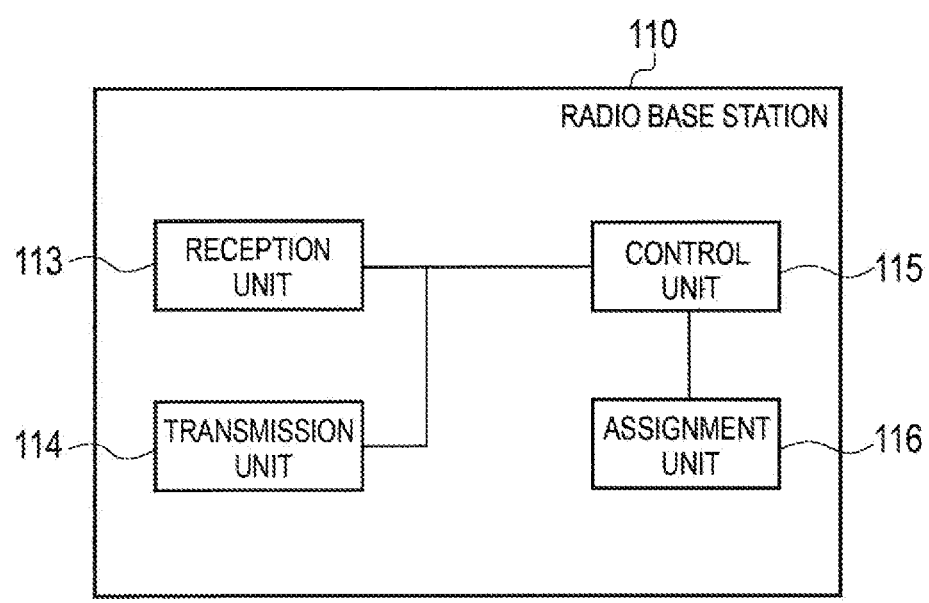
FIG. 8 is a block diagram illustrating a radio base station 110 according to the first embodiment.

Hereinafter, the radio base station according to the first embodiment will be described. FIG. 8 is a block diagram illustrating the radio base station 110 according to the first embodiment. The radio base station 110 may be the MeNB 110A or the HeNB 110B.

As illustrated in FIG. 8, the radio base station 110 includes a reception unit 113, a transmission unit 114, a control unit 115, and an assignment unit 116.

The reception unit 113 receives an uplink signal from the UE 10 connected to a cell managed by the radio base station 110. The reception unit 113, for example, receives the uplink signal through the uplink shared channel (PUSCH).

The transmission unit 114 transmits a downlink signal to the UE 10 connected to the cell managed by the radio base station 110. The transmission unit 114, for example, receives the downlink signal through the downlink shared channel (PDSCH). The transmission unit 114, for example, transmits the above dedicated DCI through the downlink control channel (PDCCH). The dedicated DCI is preferably identified by a dedicated RNTI used exclusively in the division of one resource block.

The control unit 115 controls the operation of the radio base station 110. In the first embodiment, the control unit 115 configures a determination unit that determines if one resource block is to be divided or not.

Specifically, from among the UEs 10 connected to a cell managed by the radio base station 110, if the number of UEs 10, whose communication amount is equal to or less than a predetermined threshold value, is equal to or more than a threshold value, the control unit 115 determines that one resource block is to be divided. On the other hand, if the number of UEs 10, whose communication amount is equal to or less than a predetermined threshold value, is less than the threshold value, the control unit 115 determines that one resource block is not to be divided.

Alternatively, from among the UEs 10 connected to a cell managed by the radio base station 110, if the number of UEs 10 (hereinafter, the MTC devices) that perform MTC (Machine Type Communication) is equal to or more than a threshold value, the control unit 115 determines that one resource block is to be divided. On the other hand, if the number of MTC devices is less than the threshold value, the control unit 115 determines that one resource block is to not to be divided.

The control unit 115 may separately determine if one resource block is to be divided or not, for each of the uplink shared channel (PUSCH) and the downlink shared channel (PUSCH). The control unit 115 may determine in conjunction if one resource block is to be divided or not, for both the uplink shared channel (PUSCH) and the downlink shared channel (PDSCH).

In the first embodiment, when the dedicated DCI is identified by a dedicated RNTI, if the control unit 115 determines that one resource block is to be divided, the transmission of the dedicated RNTI is instructed to the transmission unit 114.

The assignment unit 116 assigns a radio resource to the UE 10 connected to the cell managed by the radio base station 110. In the first embodiment, the assignment unit 116 divides one resource block and assigns the divided resource blocks to a plurality of UEs 10.

Specifically, when it is determined that one resource block is to be divided, the assignment unit 116 assigns the divided resource blocks to each UE 10. The assignment unit 116 instructs the transmission of the dedicated DCI including the assignment result of the divided resource block to the transmission unit 114.

(Operation of Mobile Communication System)

Figure 9:
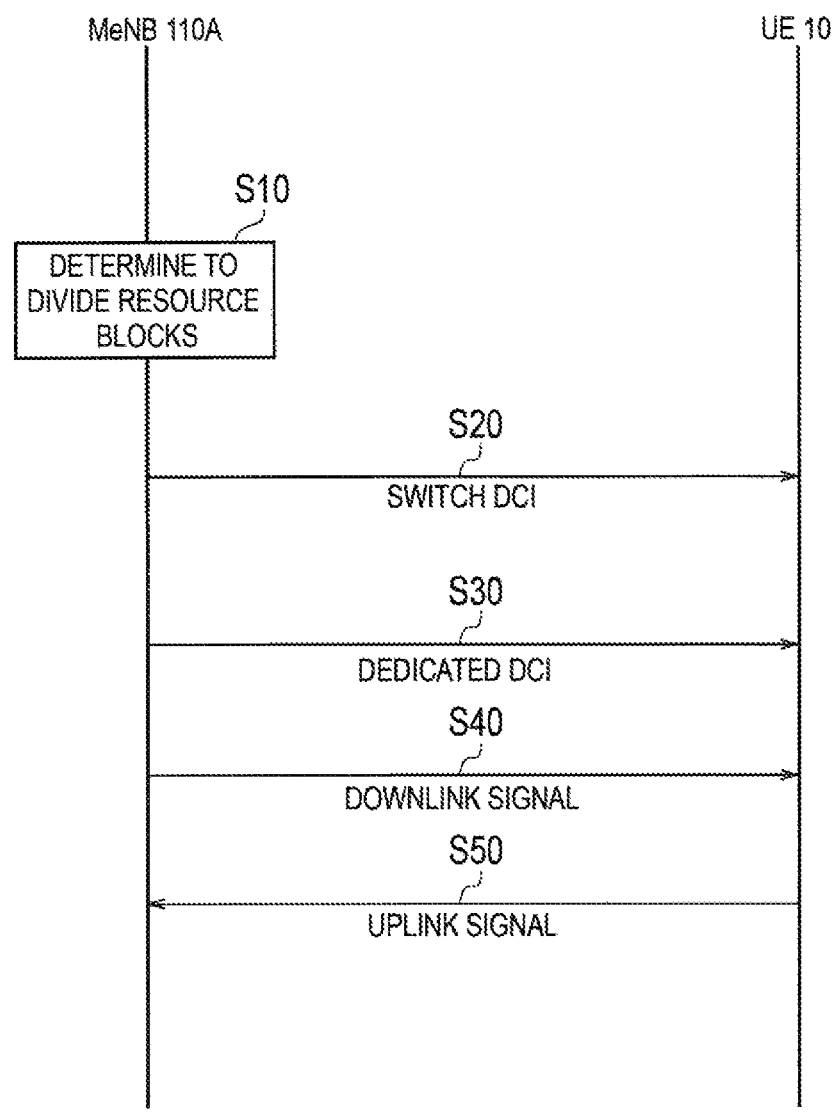
FIG. 9 is a sequence diagram illustrating an operation of the mobile communication system 100 according to the first embodiment.

Hereinafter, the operation of the mobile communication system according to the first embodiment will be described. FIG. 9 is a sequence diagram illustrating an operation of the mobile communication system 100 according to the first embodiment. A case where the radio base station 110 is the MeNB 110A will be illustrated below.

As illustrated in FIG. 9, in step 10, the MeNB 110A determines that one resource block is to be divided. As described above, based on the number of UEs 10, whose communication amount is equal to or less than a predetermined threshold value, or the number of MTC devices, the MeNB 110A determines whether or not one resource block is to be divided.

In step 20, the MeNB 110A transmits to the UE 10 that one resource block is to be divided (switching of the DCI). The switching of DCI, for example, includes the dedicated RNTI.

In step 30, the MeNB 110A transmits the dedicated DCI to the UE 10. The dedicated DCI includes at least the starting RB and the division pattern. In addition to the starting RB and the division pattern, the dedicated DCI may include the number of assigned RBs.

A case in which the division of one resource block is applicable for both the uplink shared channel (PUSCH) and the downlink shared channel (PDSCH) will be illustrated.

Therefore, in step 30, the dedicated DCI used in the uplink shared channel and the dedicated DCI used in the downlink shared channel are transmitted. It should be noted that the dedicated RNTI used in the uplink shared channel may be same as the dedicated RNTI used in the downlink shared channel, or may be different from the dedicated RNTI used in the downlink shared channel.

In step 40, the UE 10 identifies the dedicated DCI received in step 30 on the basis of the dedicated RNTI received in step 20. Based on the identified dedicated DCI, the UE 10 receives a downlink signal through the downlink shared channel (PDSCH).

In step 50, the UE 10 identifies the dedicated DCI received in step 30 on the basis of the dedicated RNTI received in step 20. Based on the identified dedicated DCI, the UE 10 transmits an uplink signal through the uplink shared channel (PDSCH).

(Operation and Effect)

In the first embodiment, the radio base station 110 divides one resource block and assigns the divided resource blocks to a plurality of UEs 10. As a result, when it is necessary to communicate a small amount of data with a large number of UEs 10, the shortage of radio resources can be prevented as compared to the case where the minimum unit of radio resources to be assigned is one resource block.

The upper limit of the number of divided resource blocks continuing on the frequency axis is decided beforehand, and consideration must be given to the fact that the technique of dividing one resource block is suitable for transmitting and receiving small amounts of data.

Furthermore, consideration must also be given to the fact because the upper limit of the number of divided resource blocks continuing on the frequency axis is decided beforehand, and the division pattern of one resource block is decided beforehand, the amount of data of a dedicated DCI is reduced.

In the first embodiment, the radio base station 110 notifies the dedicated DCI including at least the starting RB and the division pattern to a plurality of UEs 10. As a result, even when one resource block is divided, each UE 10 can appropriately receive the signal transmitted by using the divided resources.

A Modified Example 1 of an Application Scene

Figure 10:
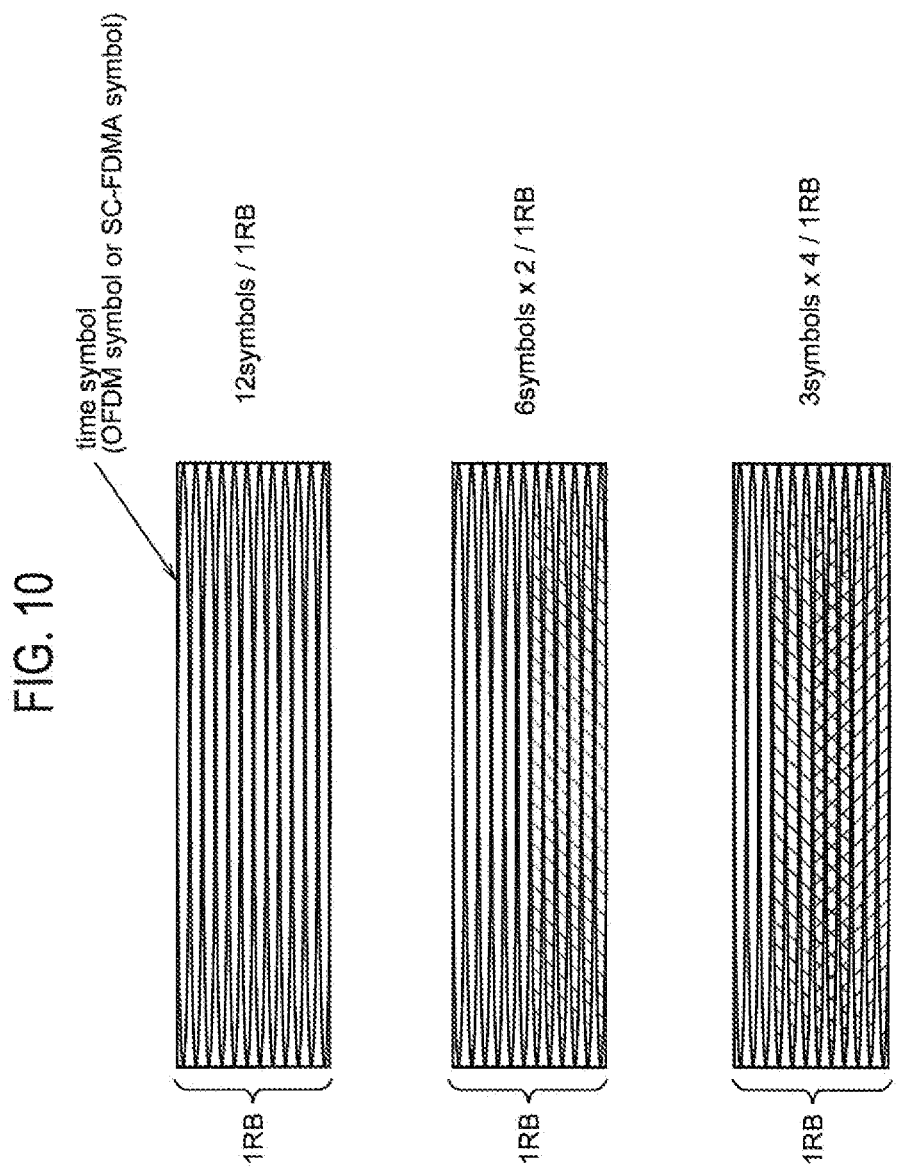
FIG. 10 is a diagram for explaining a modification example 1 of an application scene according to the first embodiment.

Next, a modified example 1 of an application scene according to the first embodiment is explained referring FIG. 10. FIG. 10 is a diagram for explaining the modified example 1 of the application scene according to the first embodiment.

It should be noted that the different part from the first embodiment described above is mainly explained, and the explanation of the same part is suitably omitted.

In the first embodiment described above, the one resource block is divided on the frequency axis. In this modified example, the one resource block is divided on the time axis. It should be noted that the one resource block is configured by a plurality of symbols (time symbol: OFDM symbol or SC-FDMA symbol).

As illustrated in FIG. 10, for example, a pattern in which one resource block is not divided (the number of symbols configuring one divided resource block is 12 sym, for example), a pattern in which one resource block is divided into two (the number of symbols configuring one divided resource block is 6 sym, for example), and a pattern in which one resource block is divided into four (the number of subcarriers configuring one divided resource block is 3 sym, for example) are allowed.

And, it is preferable to decide beforehand the upper limit of the number of divided resource blocks continuing on the frequency axis.

And, the symbols configuring the divided resource block are preferably continuous on the time axis.

And, the dedicated DCI, in this modified example, includes the starting RB and the division pattern at least. In addition to the starting RB and the division pattern, the dedicated DCI may include the number of divided resource.

Specifically, when a plurality of the resource blocks are allocated to UE10 on the frequency axis, the dedicated DCI includes the starting RB and the number of RB allocated and the division pattern. On the other hand, the one resource block is allocated to UE1 on the frequency axis, the dedicated DCI includes the starting RB and the division pattern, as the number of RB allocated is not necessary.

A Modified Example 2 of an Application Scene

Figure 11:
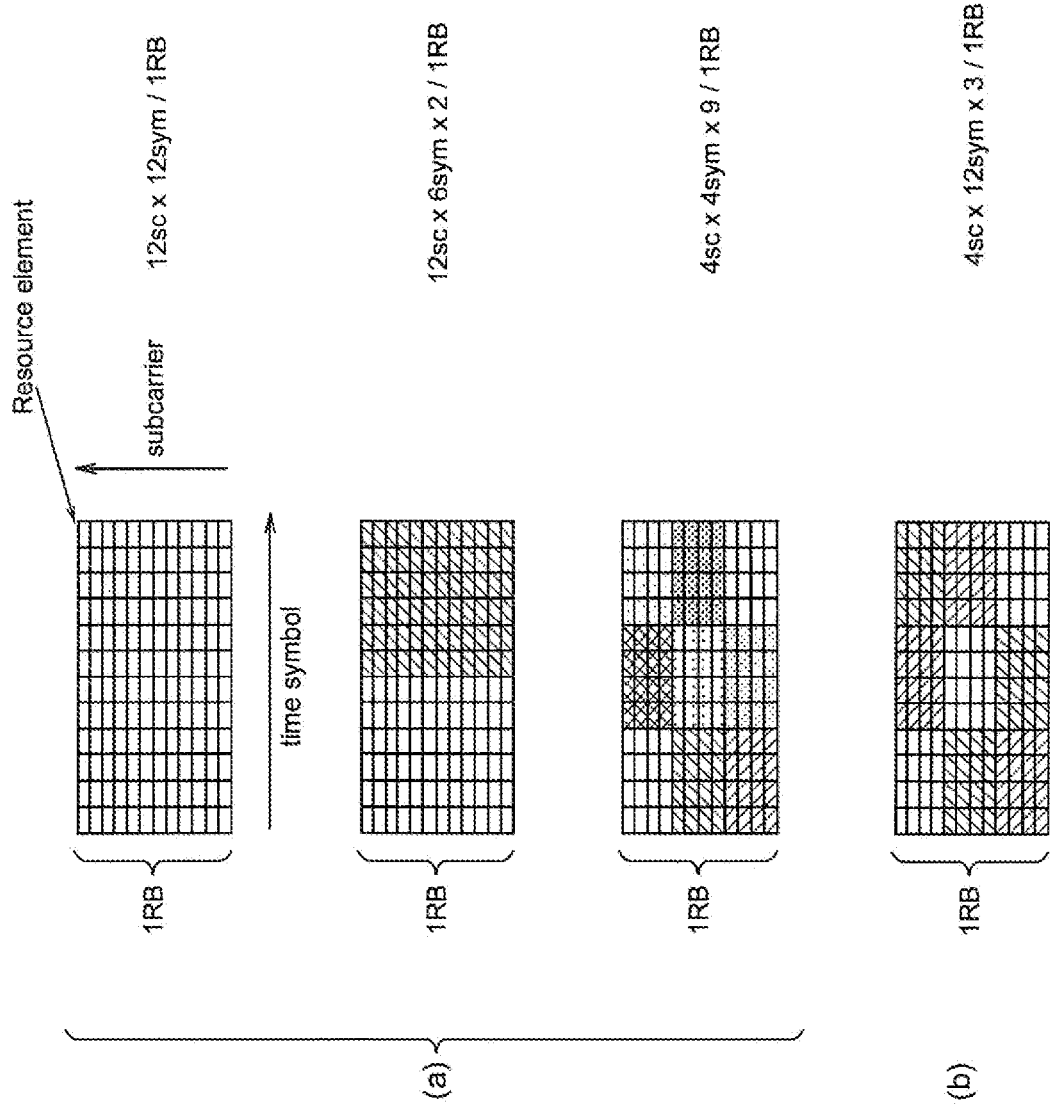
FIG. 11 is a diagram for explaining a modification example 2 of an application scene according to the first embodiment.

Next, a modified example 2 of an application scene according to the first embodiment is explained referring FIG. 11. FIG. 11 is a diagram for explaining the modified example 2 of the application scene according to the first embodiment.

It should be noted that the different part from the first embodiment described above is mainly explained, and the explanation of the same part is suitably omitted.

In the first embodiment described above, the one resource block is divided on the frequency axis. In this modified example, the one resource block is divided on the frequency axis and the time axis. It should be noted that the one resource block is configured by a plurality of resource elements (Resource element). The resource element is configured by the one symbol and the one subcarrier.

As illustrated in FIG. 11 (*a*), for example, a pattern in which one resource block is not divided (the number of resource elements configuring one divided resource block is 144: 12 sc×12 sym, for example), a pattern in which one resource block is divided into two (the number of resource elements configuring one divided resource block is 72: 12 sc×6 sym, for example), and a pattern in which one resource block is divided into nine (the number of resource elements configuring one divided resource block is 16: 4 sc×4 sym, for example) are allowed.

And a pattern in which one resource block is divided into three (the number of resource elements configuring one divided resource block is 48: 4 sc×12 sym, for example) is allowed. In this case, as it is indicated in FIG. 11 (*b*), the plurality of data, of which destinations are different, are allocated. And the plurality of data, of which destinations are different, may be allocated not overlapping in the frequency axis direction. Precisely, it is like a frequency hopping scheme is applied in the one resource block. The data to UE 10 is allocated changing the divided resource block in a predetermined time period. Thanks to this, a frequency diversity effect can be achieved. It should be noted, the base station (MeNB110A or HeNB110B) notifies an allocation pattern of data to UE 10 in this case.

And, it is preferable to decide beforehand the upper limit of the number of divided resource blocks continuing on the frequency axis.

And, it is preferable that the resource elements configuring the divided resource block is continuing on the frequency axis and the time axis. It should be noted that the resource elements configuring the divided resource block is not required to continue on the frequency axis, when the frequency hopping pattern is decided beforehand.

In this modified example, the dedicated DCI includes at least starting RB and the division pattern of the one resource block on the frequency axis and on the time axis. The division pattern may be configured by the division pattern of the one resource block on the frequency axis (hereafter, division pattern of the frequency axis) and by the division pattern of the one resource block on the time axis (hereafter, division pattern of the time axis). In addition to the starting RB and the division pattern, the dedicated DCI includes the number of RB allocated.

Specifically, the dedicated DCI includes the starting RB, the number of the allocated RB, and the division pattern (the division pattern of the frequency axis and the division pattern of the time axis), for example, when the plurality of the resource blocks is allocated to UE10 on the frequency axis. On the other hand, the one resource block is allocated on the frequency axis, the dedicated DCI includes the starting RB and the division pattern, for example.

Other Embodiments

The present invention is explained through the above embodiment, but it must not be assumed that this invention is limited by the statements and the drawings constituting a part of this disclosure. From this disclosure, various alternative embodiments, examples, and operational technologies will become apparent to those skilled in the art.

In the embodiment, in addition to the starting RB and the division pattern, the dedicated DCI used in the downlink shared channel includes the number of assigned RBs. However, the embodiment is not limited thereto. If the number of assigned RBs is decided beforehand, the dedicated DCI used in the downlink shared channel may not necessarily include the number of assigned RBs.

Moreover, the present invention is applicable not only to a mobile communication system corresponding to LTE but also to a mobile communication system based on 3GPP Release 10 standards and after (i.e. LTE Advanced)

The entire content of U.S. Provisional Application No. 61/604,733 (filed Feb. 29, 2012) is incorporated by reference.

INDUSTRIAL APPLICABILITY

As described above, as the mobile communication system, the mobile communication method and the base station, according to the present invention, can prevent the shortage of radio resource, this present invention is useful in a mobile communication field.

The invention claimed is:

1. A mobile communication system comprising:
a base station managing a cell, and a radio terminal connected to the cell,
the base station comprising:
   a transmitter configured to transmit general downlink scheduling control information and a general temporary identifier used for identifying the general downlink scheduling control information to the radio terminal, and
   a base-station-side controller configured to determine whether or not to divide one resource block configured by a plurality of resource elements, wherein
   when determining to divide the one resource block, the base-station-side controller divides the one resource block and assigns the divided resource blocks to the radio terminal,
   in response to dividing the one resource block, the transmitter transmits a special temporary identifier that is different from the general temporary identifier to the radio terminal, and
   the transmitter transmits special downlink scheduling control information to the radio terminal, the special downlink scheduling control information including at least a resource block that starts the division of the one resource block, and a division pattern of the one resource block,
the radio terminal comprising:
   a receiver configured to receive the special temporary identifier, and
   a radio-terminal-side controller configured to identify the special downlink scheduling control information by using the received special temporary identifier.

2. The mobile communication system according to claim 1, wherein the one resource block is configured by a plurality of subcarriers.

3. The mobile communication system according to claim 2, wherein the special temporary identifier is used exclusively in the division of the one resource block.

4. The mobile communication system according to claim 1, wherein the one resource block is configured by a plurality of subcarriers, and the one resource block is divided on a frequency axis.

5. The mobile communication system according to claim 1, wherein the one resource block is divided on a frequency axis and a time axis.

6. The mobile communication system according to claim 1, wherein
the mobile communication system comprises a plurality of radio terminals connected to the cell,
the base-station-side controller determines to divide the one resource block when a number of radio terminals connected to the cell having a communication amount that is equal to or less that a predetermined threshold, is equal to or more than a predetermined threshold.

7. The mobile communication system according to claim 1, wherein
the mobile communication system comprises a plurality of radio terminals connected to the cell,
the base-station-side controller determines to divide the one resource block when a number of radio terminals that perform machine type communication (MTC) in the mobile communication system is equal to or more than a predetermined threshold.

8. A mobile communication method used in a mobile communication system including a base station managing a cell and a radio terminal connected to the cell, comprising:
transmitting, by the base station, general downlink scheduling control information and a general temporary identifier used for identifying the general downlink scheduling control information to the radio terminal,
determining, by the base station, whether or not to divide one resource block configured by a plurality of resource elements,
dividing, by the base station, when determining to divide the one resource block, the one resource block
assigning, by the base station, the divided resource blocks to the radio terminal,
transmitting, by the base station, in response to dividing the one resource block, a special temporary identifier that is different from the general temporary identifier to the radio terminal,
transmitting, by the base station, special downlink scheduling control information to the radio terminal,
the special downlink scheduling control information including at least a resource block that starts the division of the one resource block and a division pattern of the one resource block,
receiving, by the radio terminal, the special temporary identifier,
identifying, by the radio terminal, the special downlink scheduling control information by using the received special temporary identifier.

9. A radio base station comprising:
a transmitter configured to transmit general downlink scheduling control information and a general temporary identifier used for identifying the general downlink scheduling control information to a radio terminal connected to a cell managed by the radio base station, and
a controller configured to determine whether or not to divide one resource block configured by a plurality of resource elements, wherein
when determining to divide the one resource block, the base-station-side controller divides the one resource block and assigns the divided resource blocks to the radio terminal,
in response to dividing the one resource block, the transmitter transmits a special temporary identifier that is different from the general temporary identifier to the radio terminal, and
the transmitter transmits
special downlink scheduling control information to the radio terminal, the special downlink scheduling control information including at least a resource block that starts the division of the one resource block, and a division pattern of the one resource block.

10. A radio terminal connected to a cell managed by a base station, comprising:
a receiver configured to receive, from the base station, general downlink scheduling control information and a general temporary identifier used for identifying the general downlink scheduling control information,
a controller configured to identify the general downlink scheduling control information by using the received general temporary identifier, wherein
the receiver further receives, from the base station, a special temporary identifier that is different from the general temporary identifier,
the controller identifies a special downlink scheduling control information by using the received special temporary identifier, the special downlink scheduling control information including at least a resource block that starts division of one resource block and a division pattern of the one resource block.

* * * * *